United States Patent
Bay et al.

(10) Patent No.: US 6,584,581 B1
(45) Date of Patent: Jun. 24, 2003

(54) CONTINUOUS FLOW CHECKPOINTING DATA PROCESSING

(75) Inventors: Paul Bay, Arlington, MA (US); Ephraim Vishniac, Arlington, MA (US); Craig W. Stanfill, Waltham, MA (US)

(73) Assignee: Ab Initio Software Corporation, Lexington, MS (US)

(*) Notice: Subject to any disclaimer, the term of this patent is extended or adjusted under 35 U.S.C. 154(b) by 155 days.

(21) Appl. No.: 09/608,995

(22) Filed: Jun. 30, 2000

(Under 37 CFR 1.47)

Related U.S. Application Data

(60) Provisional application No. 60/169,097, filed on Dec. 6, 1999.

(51) Int. Cl.[7] .................................................. G06F 11/00
(52) U.S. Cl. ............................................. 714/16; 714/19
(58) Field of Search ................................. 714/16, 17, 19; 707/202; 712/228

(56) References Cited

U.S. PATENT DOCUMENTS

| | | | |
|---|---|---|---|
| 5,495,590 A | 2/1996 | Comfort et al. | |
| 5,630,047 A | * 5/1997 | Wang | 714/15 |
| 5,692,168 A | 11/1997 | McMahan | |
| 5,712,971 A | * 1/1998 | Stanfill et al. | 714/34 |
| 5,802,267 A | * 9/1998 | Shirakihara et al. | 714/15 |
| 5,923,832 A | 7/1999 | Shirakihara et al. | |
| 6,401,216 B1 | * 6/2002 | Meth et al. | 714/16 |

* cited by examiner

Primary Examiner—Scott Baderman
(74) Attorney, Agent, or Firm—Fish & Richardson P.C.

(57) ABSTRACT

A data processing system and method that provides checkpointing and permits a continuous flow of data processing by allowing each process to return to operation after checkpointing, independently of the time required by other processes to checkpoint their state. Checkpointing in accordance with the invention makes use of a command message from a checkpoint processor that sequentially propagates through a process stage from data sources through processes to data sinks, triggering each process to checkpoint its state and then pass on a checkpointing message to connected "downstream" processes. This approach provides checkpointing and permits a continuous flow of data processing by allowing each process to return to normal operation after checkpointing, independently of the time required by other processes to checkpoint their state.

48 Claims, 10 Drawing Sheets

Data Queue

Input Data Queue

Output Data Queue

CONTINUOUS FLOW CHECKPOINTING DATA PROCESSING

CLAIM OF PRIORITY

This application claims priority under 35 USC §119(e) to U.S. patent application Ser. No. 60/169,097, filed on Dec. 6, 1999, the entire contents of which are hereby incorporated by reference.

TECHNICAL FIELD

This invention relates to data processing, and more particularly to a system, method, and computer program for continuous flow checkpointing data processing.

BACKGROUND

With the huge popularity of the Internet for data access and electronic commerce comes a need for high-performance, fault tolerant "back-office" processing capabilities that allow large volumes of data to be processed essentially continuously and in near real-time (i.e., responding to a user's input within a few seconds to a few minutes). Such processing capabilities should be robust (i.e., fault tolerant) to allow processing to continue where it left off after a failure. While such capabilities are useful for large-scale Internet-based data processing, they are often also applicable to conventional types of data processing over private networks and communication systems (e.g., airline reservation systems, internal corporate "intranets", etc.).

Achieving high performance for a particular volume of data often means using a parallel processing system to process the data within a reasonable response time. Numerous examples of parallel processing systems are known. For example, FIG. 1 is a block diagram of a typical prior art multi-process data processing system 100. Data from an ultimate source 101 (e.g., a web server) is communicated to at least one data queue 102. Data is read, or "consumed", from time to time by an initial process 104, which outputs processed data to one or more data queues 106, 106'. The process 104 typically is a single process that uses a two-phase commit protocol to coordinate consumption of input data and propagation of output data, in known fashion. Subsequent processes 108, 108' may be linked (shown as being in parallel) to provide additional processing and output to subsequent data queues 110, 110'. The data is finally output to an ultimate consumer 112, such as a relational database management system (RDBMS). In practice, such a system may have many processes, and more parallelism than is shown. Further, each process may consume data from multiple data queues, and output data to multiple data queues.

To obtain fault tolerance, such systems have used "checkpointing" techniques that allow a computational system to be "rolled back" to a known, good set of data and machine state. In particular, checkpointing allows the application to be continued from a checkpoint that captures an intermediate state of the computation, rather than re-running the entire application from the beginning. Examples of checkpointing systems are described in U.S. Pat. No. 5,819,021, entitled "Overpositioning System and Method for Increasing Checkpoints in Component-Based Parallel Applications", and U.S. Pat. No. 5,712,971, entitled "Methods and Systems for Reconstructing the State of a Computation", both assigned to the assignee of the present invention.

A problem with using traditional checkpointing techniques with data where essentially continuous data processing is desired (e.g., Internet data processing) is that checkpoints may only be created when the system is quiescent, i.e., when no processes are executing. Thus, every process would have to suspend execution for the time required by the process that requires the longest time to save its state. Such suspension may adversely impact continuous processing of data.

Accordingly, the inventors have determined that there is a need to provide for a data processing system and method that provides checkpointing and permits a continuous flow of data processing by allowing each process to return to operation after checkpointing, independently of the time required by other processes to checkpoint their state. The present invention provides a method, system, and computer program that provides these and other benefits.

SUMMARY

The invention includes a data processing system and method that provides checkpointing and permits a continuous flow of data processing by allowing each process to return to operation after checkpointing, independently of the time required by other processes to checkpoint their state.

In particular, checkpointing in accordance with the invention makes use of a command message from a checkpoint processor that sequentially propagates through a process stage from data sources through processes to data sinks, triggering each process to checkpoint its state and then pass on a checkpointing message to connected "downstream" processes. This approach provides checkpointing and permits a continuous flow of data processing by allowing each process to return to normal operation after checkpointing, independently of the time required by other processes to checkpoint their state. This approach reduces "end-to-end latency" for each process stage (i.e., the total processing time for data from a data source to a data sink in a process stage), which in turn reduces end-to-end latency for the entire data processing system.

More particularly, the invention includes a method, system, and computer program for continuous flow checkpointing in a data processing system having at least one process stage comprising a data flow and at least two processes linked by the data flow, including propagating at least one command message through the process stage as part of the data flow, and checkpointing each process within the process stage in response to receipt by each process of at least one command message.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Overview

Figure 1:
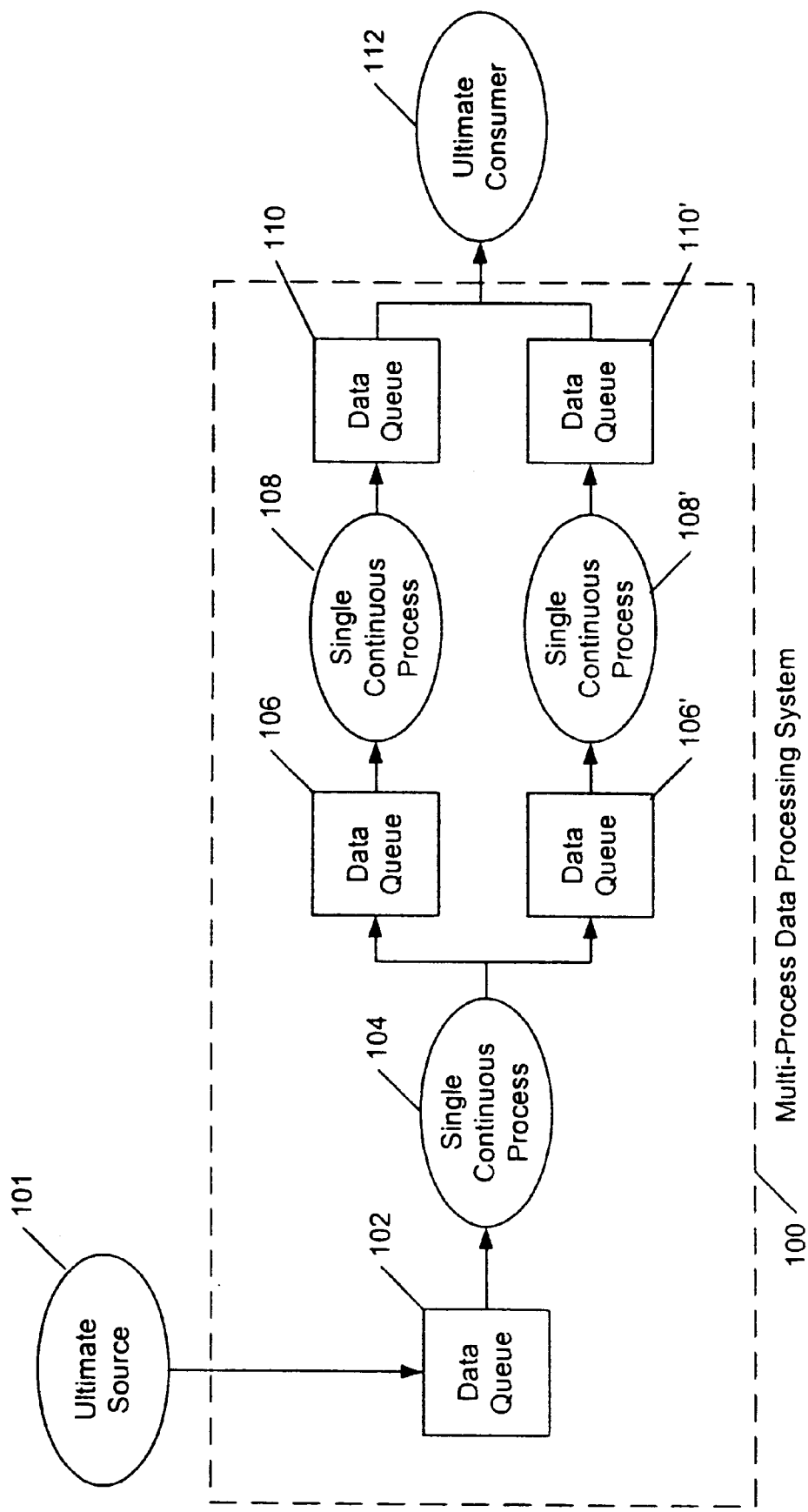
FIG. 1 is a block diagram of a prior art data processing system that may be used in conjunction with the present invention.
Figure 2:
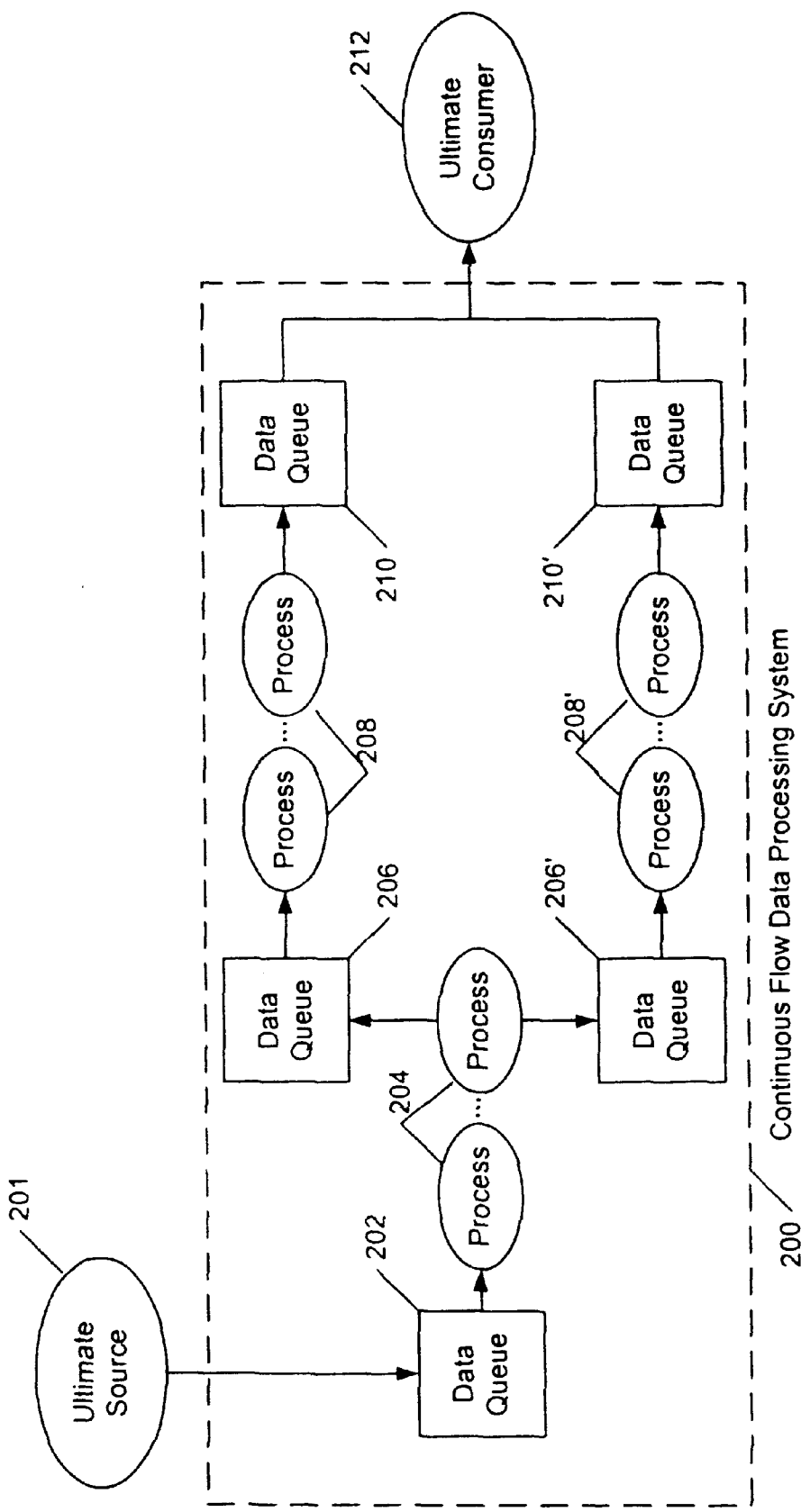
FIG. 2 is a block diagram of a continuous flow data processing system in accordance with the invention.

FIG. 2 is a block diagram of a continuous flow data processing system 200 in accordance with the invention. Data from an ultimate source 201 (e.g., a web server) is communicated to at least one data queue 202. Data is read, or "consumed", from time to time by an initial process stage 204 of one or more parallel sets of sequentially linked processes, each of which outputs processed data to one or more data queues 206, 206'. Subsequent process stages 208, 208' may be linked (shown as being in parallel) to provide additional processing and output to subsequent data queues 210, 210'. The data is finally output to an ultimate consumer 212, such as a relational database management system (RDBMS). The entire set of processes forms an acyclic graph. Within a process stage, the processes being performed by each parallel set of linked processes is the same. In practice, such a system may have many process stages, and more parallelism than is shown. Further, each process may consume data from multiple data queues, and output data to multiple data queues.

Figure 3:
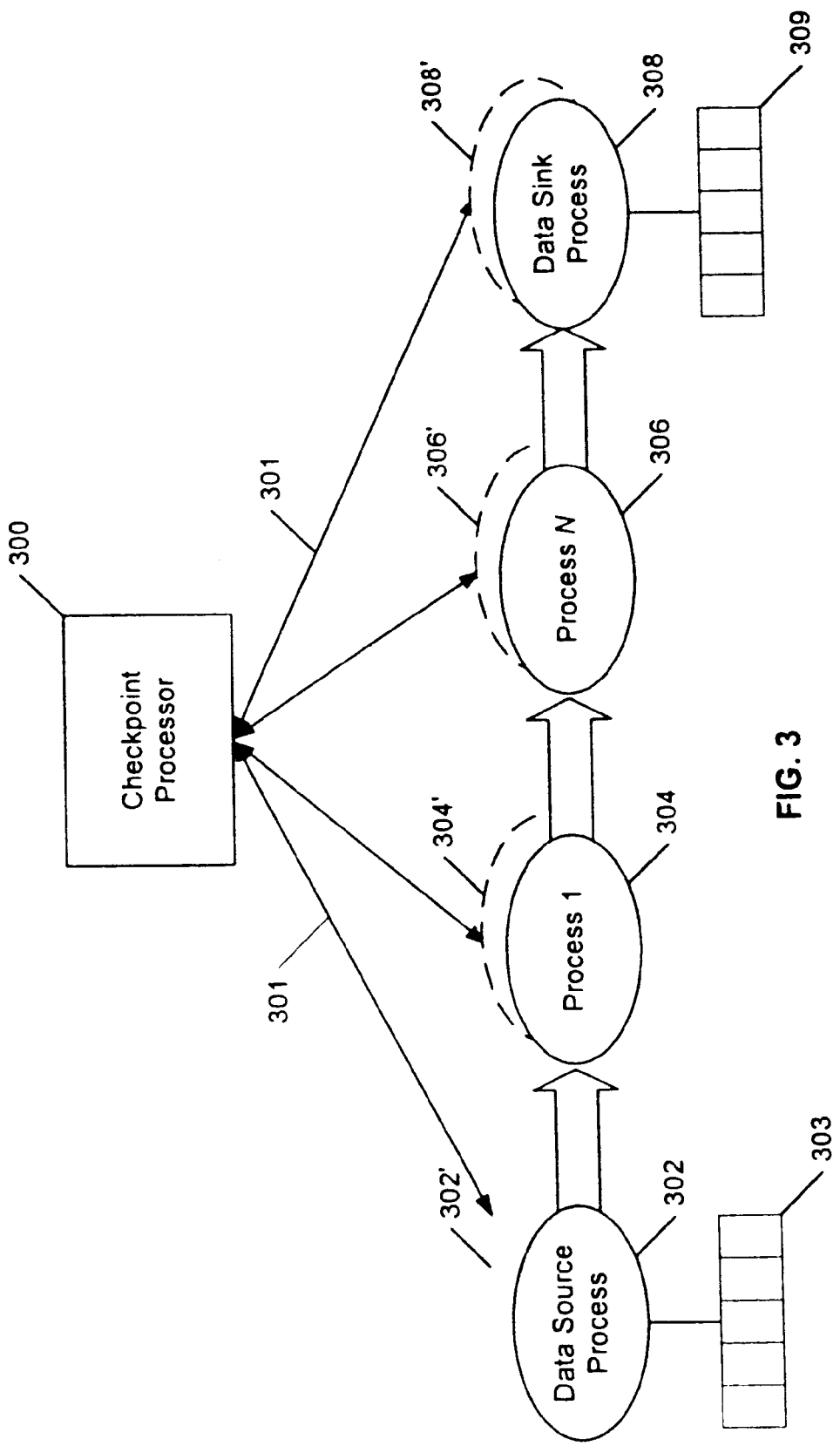
FIG. 3 is block diagram of one process stage in accordance with the invention.

FIG. 3 is block diagram of one process stage in accordance with the invention. Each process stage forms an acyclic graph. A Checkpoint Processor 300 is coupled by communication channels 301 to all data Sources 302, 302', Processes 304, 304' . . . 306, 306', and data Sinks 308, 308' comprising the process stage. Generally, all communication channels 301 are bi-directional.

Data Sources ("Sources") 302, 302' are processes that access associated data queues 303 for receiving and storing input data (e.g., user queries) and from which data can be read. Each Source can checkpoint the data in its data queue so that, upon a system failure, data subsequent to a checkpoint can be re-read.

Data Sinks ("Sinks") 308, 308' are processes that access associated data queues 309 for receiving processed data and from which data can be output or published (e.g., printed, displayed, or stored) from time to time. Each Sink can checkpoint the data in its data queue so that, upon a system failure, data subsequent to a checkpoint can be re-output.

Processes 304, 304' . . . 306, 306' directly or indirectly receive input from one or more Sources 302, 302' and ultimately output results to a Sink 308, 308'. A Process can checkpoint its data and processing state so that, upon a system failure, the state can be reconstructed and processing can continue from the last checkpoint without loss of data.

Initial parallel Processes 304, 304' within a stage may be coupled in parallel to multiple partitioned Sources 304, 304' that contain similar data types, and may also be coupled to multiple independent Sources that may contain dissimilar data types. Final parallel Processes 306, 306' within a stage may be coupled in parallel to multiple partitioned Sinks 308, 308', and may also be coupled to multiple independent Sinks. A Sink for one Process may be a Source for a subsequent process stage. Data flow is unidirectional, from Sources, through Processes, to Sinks. Processes optionally may be omitted, such that Sinks directly connect to Sources. Control messages that propagate through a stage do not bypass data, but are processed in sequential order of occurrence.

Figure 4:
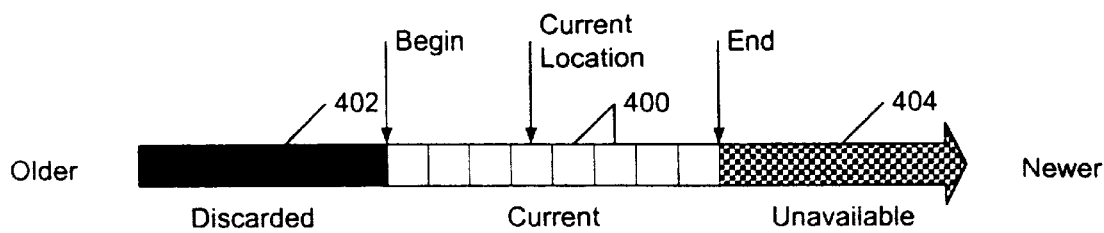
FIG. 4 is a diagram of a data queue suitable for use with the invention.

FIG. 4 is a diagram of a data queue suitable for use with the invention. Data records are stored in a logically linear queue, sequentially arranged from older to newer in time. The actual physical storage may be in a random access memory or on media. The queue is typically divided into a set of current records 400, discardable records 402, and unavailable records 404. Unavailable records 404 may be, for example, data records that have been received from an external source and stored, but not yet made available for processing. Discardable records 402 are records that have been consumed or published, but whose storage space has not yet been reclaimed.

A Current Location pointer may be used to indicate a current record. A "begin" pointer is typically used to demarcate discarded records from current records, and an "end" pointer is typically used to demarcate current records from unavailable records.

Continuous Flow Checkpointing

An important aspect of the invention is that checkpointing makes use of a command message from the Checkpoint Processor 300 that sequentially propagates through a process stage from Sources 302 through Processes 304, 306 to Sinks 308, triggering each process to checkpoint its state and then pass on a checkpointing message to connected "downstream" processes. This approach provides checkpointing and permits a continuous flow of data processing by allowing each triggered process to return to normal operation after checkpointing, independently of the time required by other processes to checkpoint their state. This approach reduces "end-to-end latency" for each process stage (i.e., the total processing time for data from a Source to a Sink in a process stage), which in turn reduces end-to-end latency for the entire data processing system 200. Thus, a graph can produce usable output while a job is still running. Further, input data that was taken in at a time prior to the last saved state (a "commited checkpoint" in continuous flow terminology) may be safely deleted, because it will not be needed again by the graph.

Figure 6:
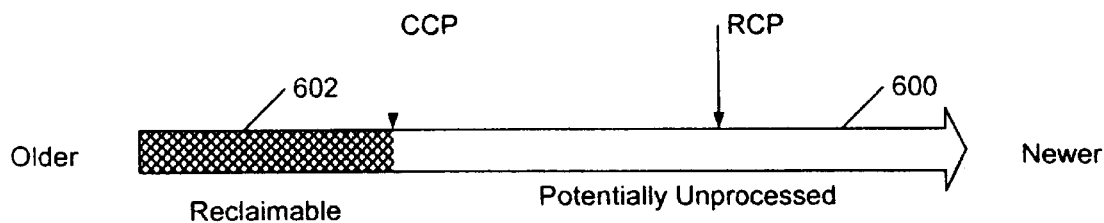
FIG. 6 is a diagram of an input data queue for a continuous flow checkpointing data processing system.
Figure 7:
FIG. 7 is a diagram of an output data queue for a continuous flow checkpointing data processing system.

FIGS. 5A–5D are a flowchart showing one embodiment of a method for initiating a checkpoint in a process stage of a continuous flow checkpointing data processing system. FIG. 6 is a diagram of an input data queue for a continuous flow checkpointing data processing system. FIG. 7 is a diagram of an output data queue for a continuous flow checkpointing data processing system.

1. Checkpoint Processor:

Step 500: Determines that a Checkpoint (CP) trigger event has occurred. A checkpoint may be triggered in a number of ways, as discussed below.

Step 502: Generates a Checkpoint Request Message and transmits it to each Source. The Checkpoint Request Message includes values for a "Requested Checkpoint" (RCP) flag and a "Committed Checkpoint" (CCP) flag (Step 502). In the preferred embodiment, these values are numeric, and the RCP value is always greater than the CCP value. For example, initially, the respective values of the RCP and the CCP for a first checkpoint event might be "1, 0".

2. Sources—Upon Receipt of a Checkpoint Request Message, Each Source:

Step 504: Either completes pending computations, or suspends any pending computations and saves them as part of checkpointing.

Step 506: Deletes any previously existing Checkpoint Record that does not correspond to the current CCP value as indicated in the Checkpoint Request Message, and optionally reclaims the associated storage space. When numeric values are used, records may be deleted that have a CCP tag or index that is less than the current CCP value. If numeric values are not used (e.g., Boolean flags are used) for the two checkpoint values, care must be taken to delete records corresponding to "old" Checkpoint Records before storing the current CCP value over an old CCP value. Although reclaiming Checkpoint Record storage may be done in a different order, deleting at this point in the process frees storage space up earlier rather than later.

Step 508: Creates a Checkpoint Record in non-volatile storage (e.g., magnetic media, such as a hard disk drive) in sufficient detail to reconstruct the state of the Source as of the generation of the Checkpoint Record (i.e., it "saves state"). Each Checkpoint Record includes the current "read" position in the Source's data queue, and is tagged or indexed with the RCP from the Checkpoint Request Message (e.g., with the value "1"). FIG. 6 shows a pointer, RCP, to a data record in a queue of potentially unprocessed data 600 in an input data queue where the RCP Checkpoint Record event occurs. A second pointer, CCP, points to a data record separating potentially unprocessed data from data that had already been processed before a prior checkpointing event. Data records in the queue between the RCP and CCP pointers are part of the saved state. Note that for a subsequent checkpointing operation, the RCP pointer is treated as the prior CCP pointer value (this occurs automatically by using numeric values for RCP and CCP flags and making simple arithmetic comparisons of values).

Step 510: Optionally, reclaims any storage space in the data queue that occurs before a saved data queue position, CCP, indicated by the current CCP value. Note that there may be multiple CCP pointers if multiple checkpointing operations are in progress concurrently. Using numeric values for RCP and CCP flags makes matching of corresponding pointers easier by using simple arithmetic comparisons.

Step 512: Propagates a Checkpoint Message downstream to any Process that consumes data from the Source's data queue. The Checkpoint Message includes the RCP and the CCP from the original Checkpoint Request Message.

Step 514: Resumes processing. Thus, while downstream processes are saving state, the Sources can receive data and perform any other application specific functions in preparation for providing data to Processes.

3. Processes—Upon Receiving Each Checkpoint Message, Each Process:

Step 516: Either completes pending computations, or suspends any pending computations and saves them as part of checkpointing.

Step 518: Saves each received Checkpoint Message in non-volatile storage.

Step 520: Suspends reading from the corresponding Sources.

Step 522: Upon receiving Checkpoint Messages from all connected Sources or upstream Processes (as determined from the saved Checkpoint Messages), deletes any previously existing Checkpoint Record that does not correspond to the current CCP value as indicated in the Checkpoint Request Message, and optionally reclaims the associated storage space.

Step 524: Creates a Checkpoint Record in non-volatile storage that includes the current processing state, and which is tagged or indexed with the current RCP value.

Step 526: Propagates a Checkpoint Message "downstream" to any connected Process or Sink. Again, the Checkpoint Message includes the RCP and the CCP from the original Checkpoint Request Message.

Step 528: Resumes processing.

4. Sinks—Upon Receiving Checkpoint Messages from All Connected Processes Or Sources, Each Sink:

Step 530: Either completes pending computations, or suspends any pending computations and saves them as part of checkpointing.

Step 532: Deletes any previously existing Checkpoint Record that does not correspond to the current CCP value as indicated in the Checkpoint Request Message, and optionally reclaims the associated storage space.

Step 534: Creates a Checkpoint Record in non-volatile storage that includes the current "publishable" position in the Sink's data queue, and is tagged or indexed with the current RCP value (e.g., "1"). FIG. 7 shows a pointer, RCP, to a data record in a queue of publishable data 700 in an output data queue where the RCP Checkpoint Record event occurs. A second pointer, CCP, points to a data record separating publishable data from data that had already been published before a prior checkpointing event.

Step 536: Optionally, reclaims any storage space in the data queue that occurs before a saved data queue position, CCP, indicated by the current CCP value. Such data has already been published. Note that there may be multiple CCP pointers if multiple checkpointing operations are in progress concurrently. Using numeric values for RCP and CCP flags makes matching of corresponding pointers easier by using simple arithmetic comparisons.

Step 538: Causes any existing output that has not yet been published to be stored (buffered) in non-volatile storage, and tags the output with the current RCP value. Such output comprises the records in the queue between the RCP and CCP pointers.

Step 540: Transmits a Checkpoint Message to the Checkpoint Processor. Again, the Checkpoint Message includes the RCP and the CCP from the original Checkpoint Request Message.

5. Checkpoint Processor—Upon Receiving Checkpoint Messages From All Connected Sinks, the Checkpoint Processor:

Step 542: Updates or increments the stored value of the CCP variable, and stores the new CCP value in non-volatile storage (equivalently, the CCP variable is set to the current value of the RCP variable from the Checkpoint Messages). For example, if the respective values of the RCP and the CCP for a checkpoint event are "1, 0", the values will be "1, 1" after this step.

Step 544: Transmits the new CCP value to all Sinks.

6. Sinks—Each Sink:

Step 546: Publishes all buffered data tagged with an RCP value equal to the received new CCP value. In the illustrated example, such data comprises the records in the queue between the RCP pointer (corresponding to a value of "1") and the CCP pointer (corresponding to a value of "0") in FIG. 7.

Step 548: Resumes processing.

This ends the checkpointing process. Note that some steps may be done in a different order. For example, each Sink may resume processing (Step 548) either before publishing of buffered tagged data (Step 546), or after storing unpublished data (Step 538), with respect to data that becomes available after the RCP Checkpoint Record event occurs.

Recovery From a Failure

Figure 8:
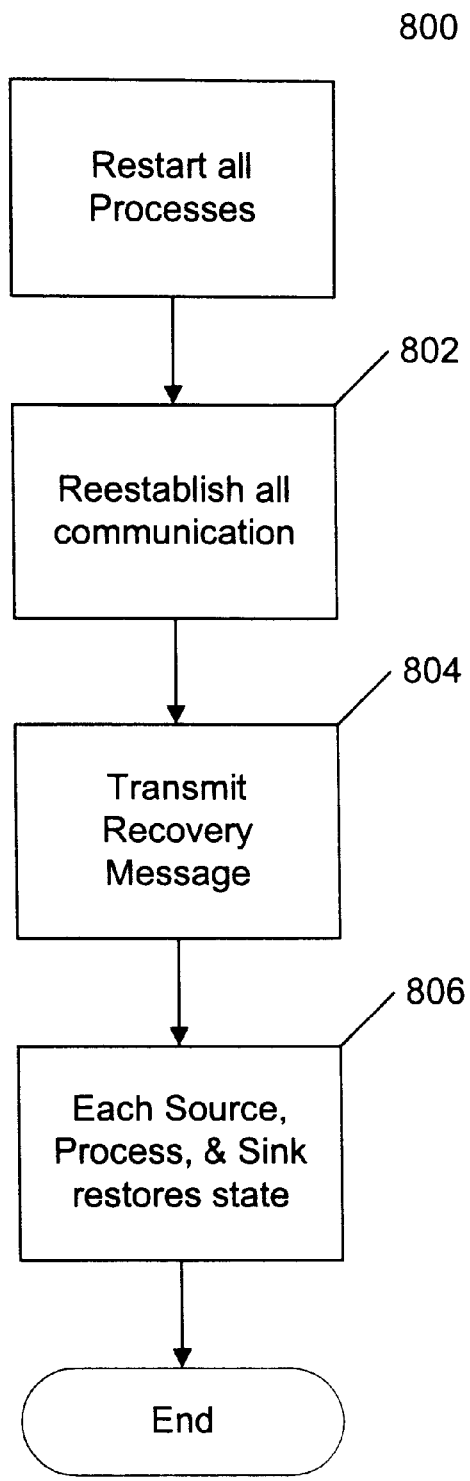
FIG. 8 is a flowchart of a method for recovery of state when a system failure occurs after a checkpointing event.

FIG. 8 is a flowchart of a method for recovery of state when a system failure occurs after a checkpointing event.

Step 800: Restart all Processes.

Step 802: Reestablish all communication links between Sources, Processes, Sinks, and the Checkpoint Processor.

Step 804: Transmit a Recovery Message, including the current CCP value, from the Checkpoint Processor to all Sources, Processes, and Sinks.

Step 806: Each Source, Process, and Sink restores its state as defined in its Checkpoint Record corresponding to the received CCP value. In particular:

Each Sink publishes data occurring before the position indicated by its Checkpoint Record corresponding to the received CCP value, and discards any data occurring after that position, taking care not to re-publish data that has already been published. This step may be necessary, for example, if a failure occurs after a Sink receives a new CCP value but before it has had time to publish its pending data records.

Each Source "rewinds" its read operation to the position indicated by its Checkpoint Record corresponding to the received CCP value.

Triggering a Checkpoint

Figure 9:
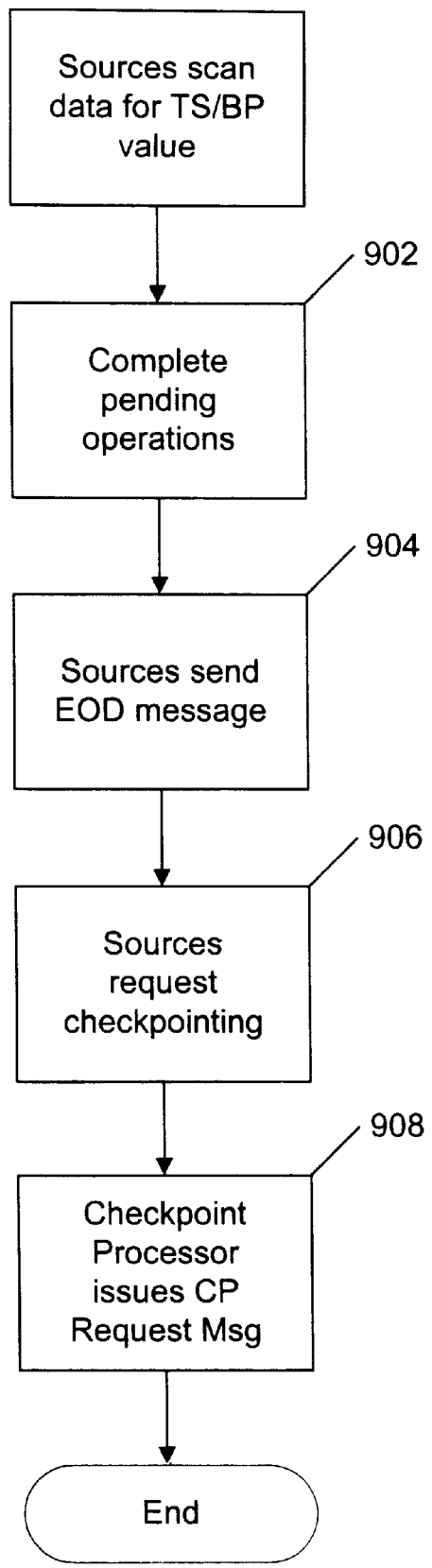
FIG. 9 is a flowchart of one method for coordinating checkpointing based on data values.

A checkpoint operation may be triggered in a number of ways. For example, checkpointing may be based on time and periodically performed, or it may be based on an external stimulus (e.g., a network operating system message of pending network shutdown). In one embodiment of the invention, checkpointing may be based on data values within or derived from records being processed. For example, the data records may include timestamps (TS) or breakpoint (BP) values. It may be desirable to checkpoint after completing computations for data with a particular timestamp or breakpoint value or range. FIG. 9 is a flowchart of one method for coordinating checkpointing based on pre-determined data values "known" to all processes (i.e., Sources, Processes, and Sinks):

Step 900: Each Source scans incoming data for the pre-determined TS/BP value. The following steps are performed once a triggering value is detected by at least one Source.

Step 902: Optionally, each Source completes pending computations.

Step 904: Each triggered Source sends an "End of Data" (EOD) control message to all outputs. This avoids certain deadlock scenarios where one Source detects a triggering TS/BP value and stops providing data records to a downstream Process. A second Source may not have reached a triggering TS/BP value but has filled its output buffer with data records for consumption by the downstream Process. The consuming Process connected to the two Sources may futilely wait until a next data record comes from the first Source (which has stopped providing new data), and never consume buffered data records from the second Source (which cannot reach a triggering TS/BP value in some yet-to-be-processed data record because its output buffer is full). Hence, deadlock results. By using an explicit EOD message, the downstream Process is instructed that no more data is coming from the first Source, and thus does not futilely wait for such data.

Step 906: Each Source sends a control message to the Checkpoint Processor, requesting checkpointing.

Step 908: When the Checkpoint Processor receives control messages from all Sources, it issues a Checkpoint Request Message and checkpointing progresses as described above.

An enhancement to the above process provides a procedure by which Sources and the Checkpoint Processor negotiate the initiation of checkpointing. This procedure may be useful where there must be a coordinated generation of output (e.g., certain aggregations of data should be produced before checkpointing) and there is no advance knowledge of what specific BP/TS values should be used as a checkpointing trigger. In such a case, the Checkpoint Processor can poll each Source to determine the current value of one or more fields which can be used to determine a timestamp or breakpoint based trigger. The Checkpoint Processor then determines a suitable global BP/TS value, and broadcasts that value to each Source. Processing then can proceed as described with respect to FIG. 9.

Another aspect of some embodiments of the invention is that they can reduce the overhead burden of checkpointing by coordinating checkpoint events with periodic production of output (e.g., aggregations that consume a number of records to produce one record). For example, it may be more efficient to aggregate and publish data and then run a checkpoint, so that the amount of state to save is reduced (e.g., less in-process data has to be saved). Accordingly, the issuance of Checkpoint Request Messages can be coordinated with publication of data reduction or aggregation operations. Such coordination may be set up by a programmer. Alternatively, coordination may be automatically triggered by having each Sink send a control message to the Checkpoint Processor after performing a data reduction or aggregation operation. The Checkpoint Processor can then initiate a checkpoint, operation after receiving a control message from each Sink. As another alternative, a Checkpoint Message may be used to trigger publication of a data reduction or aggregation operation. That is, the Checkpoint Message serves as an indicator that all the data records in a group to be aggregated or reduced have been received.

Job Shutdown

It is preferable to use an explicit "Job Shutdown" procedure with embodiments of the invention of the type described above. Such a procedure insures that each process of the data processing system distinguishes an orderly shutdown of processing from a failure of an upstream process. One procedure that may be used is to have the Checkpoint Processor notify each Source to terminate processing. For example, the Checkpoint Processor may be notified to shutdown based on a schedule or from an external trigger, such as an operating system message. In turn, the Checkpoint Processor can initiate a checkpoint operation and send an "End of Job" (EOJ) message to all sources. A convenient way of sending the EOJ message is to tag a normal Checkpoint Request Message with an EOJ flag. On receiving an EOJ flag, each Source performs a normal checkpoint routine but exits instead of resumes operation. As described above, each Source propagates a Checkpoint Message downstream. Each Process similarly performs a normal checkpoint routine and exits instead of resuming operation. When a Checkpoint Message propagates down to Sinks, each Sink similarly performs a normal checkpoint routine. However, each Sink only exits after the Checkpoint Processor returns a new CCP value and the Sink publishes pending data, as described above.

Early Publication

Figure 5A:
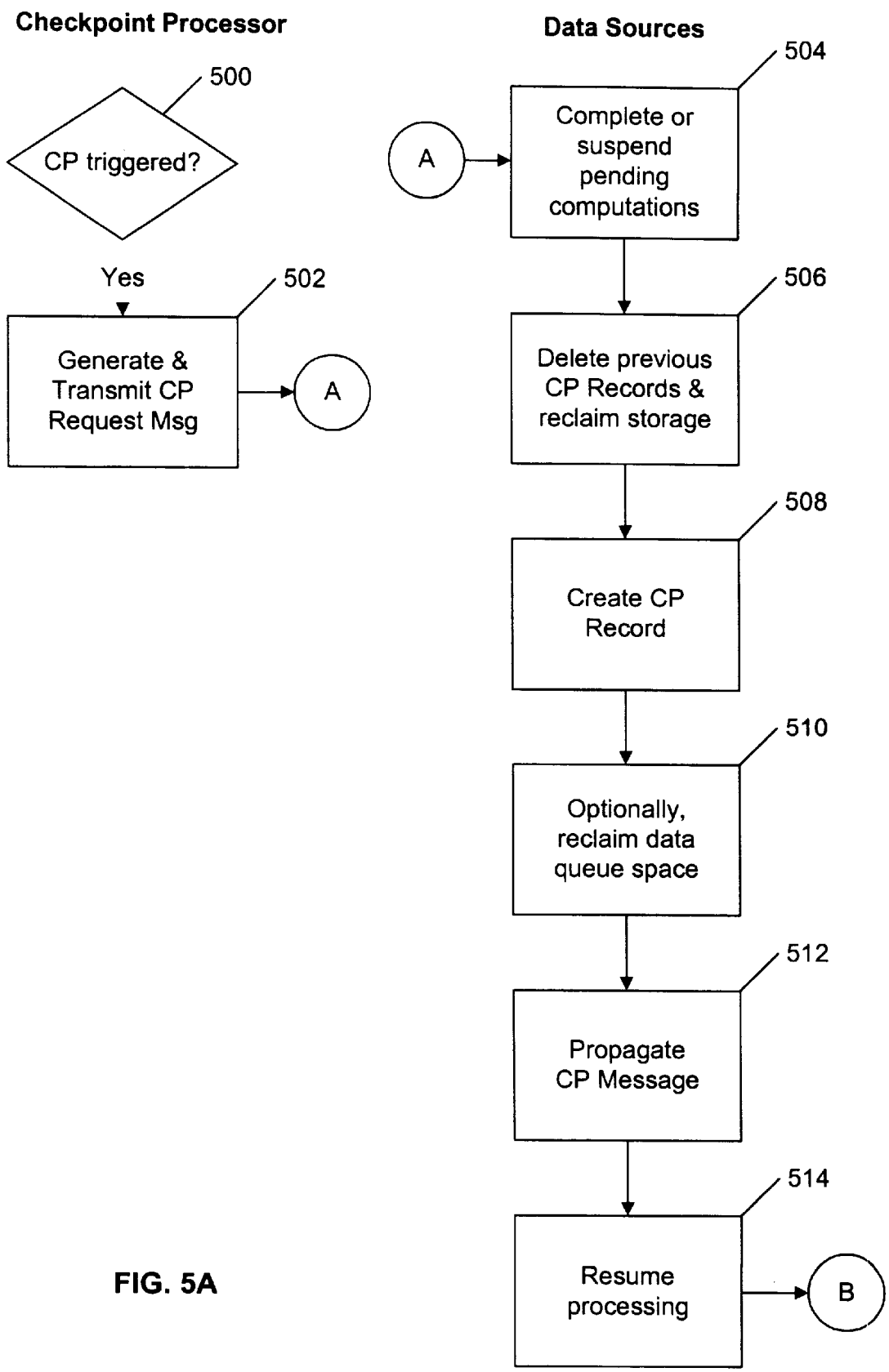
FIGS. 5A–5D are a flowchart showing one embodiment of a method for initiating a checkpoint in a process stage of a continuous flow checkpointing data processing system.
Figure 5B:
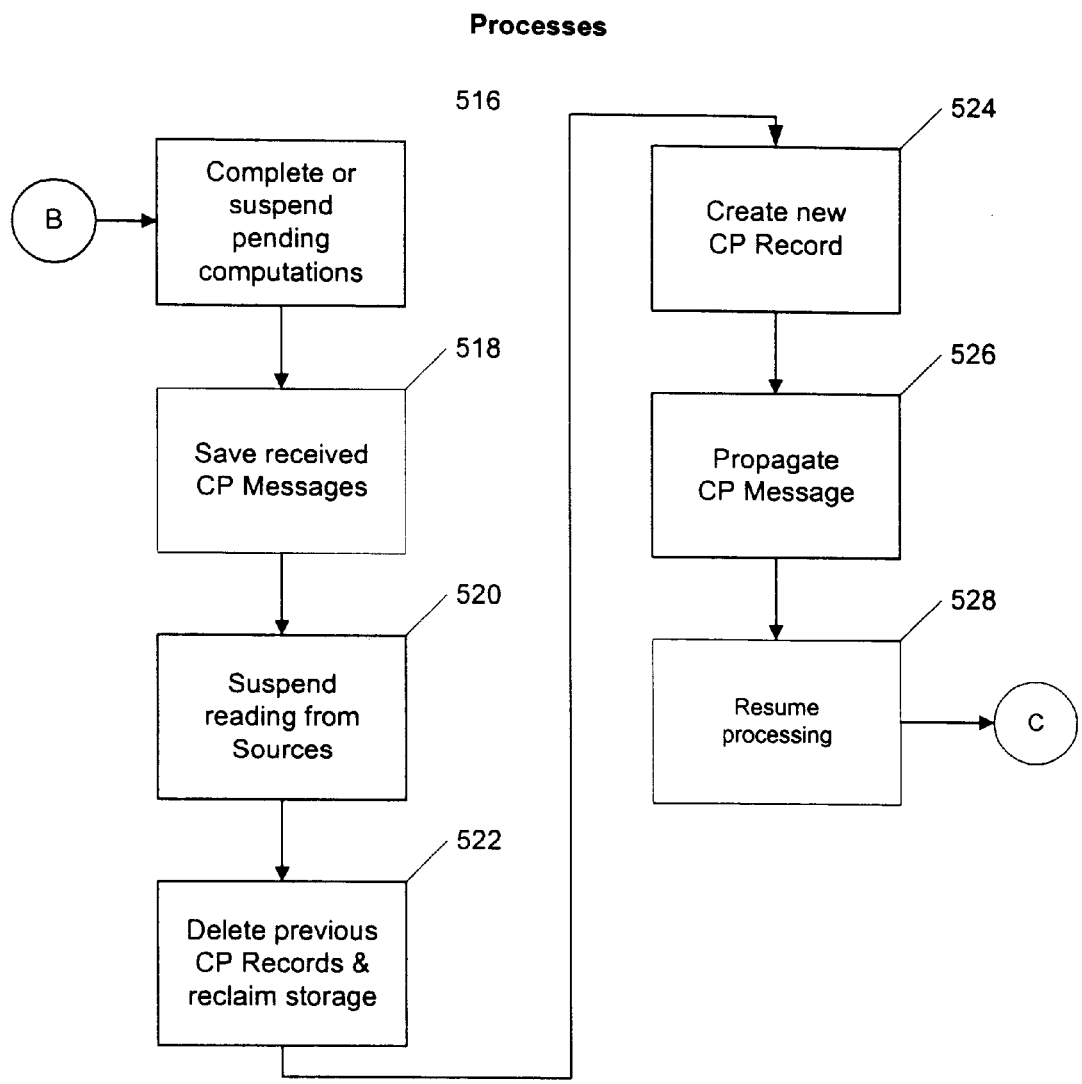
Figure 5C:
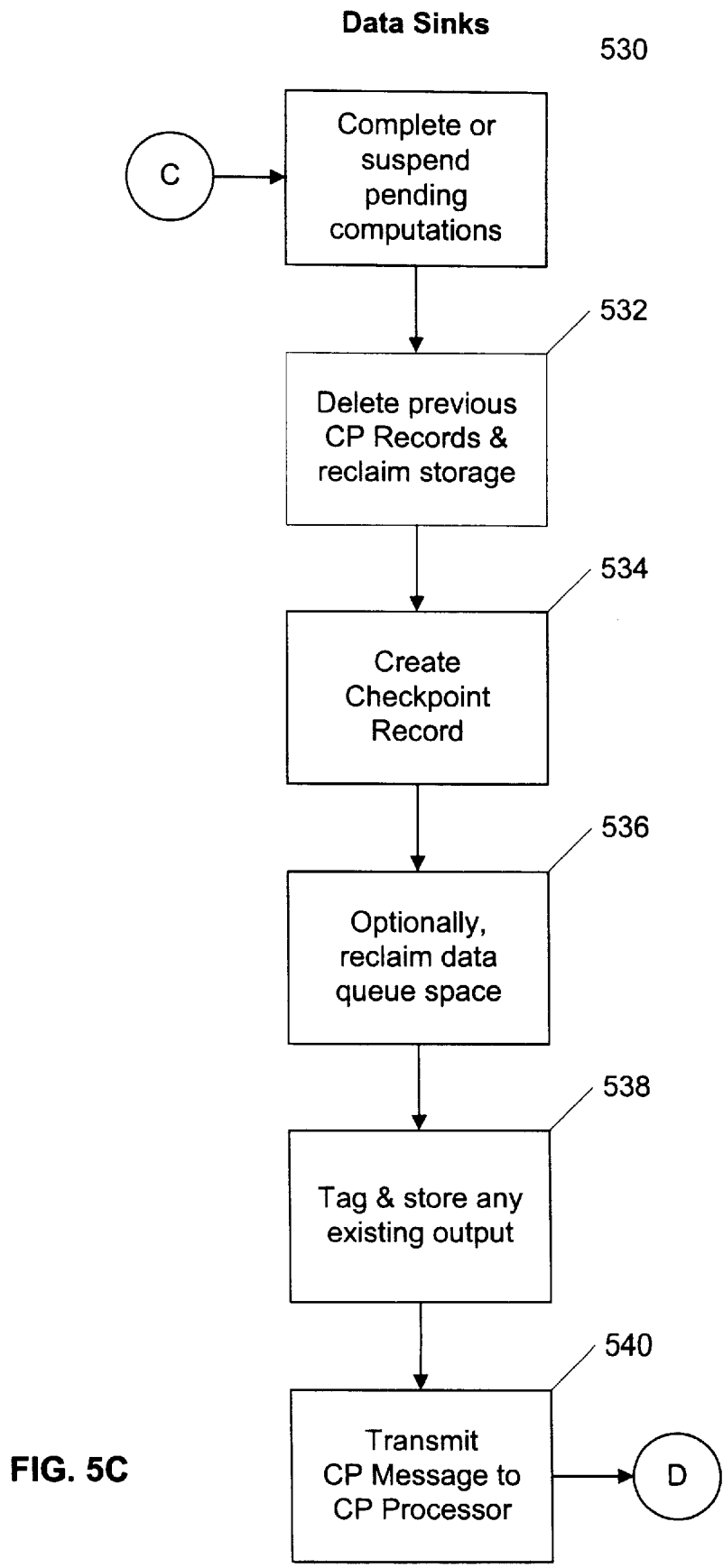
Figure 5D:
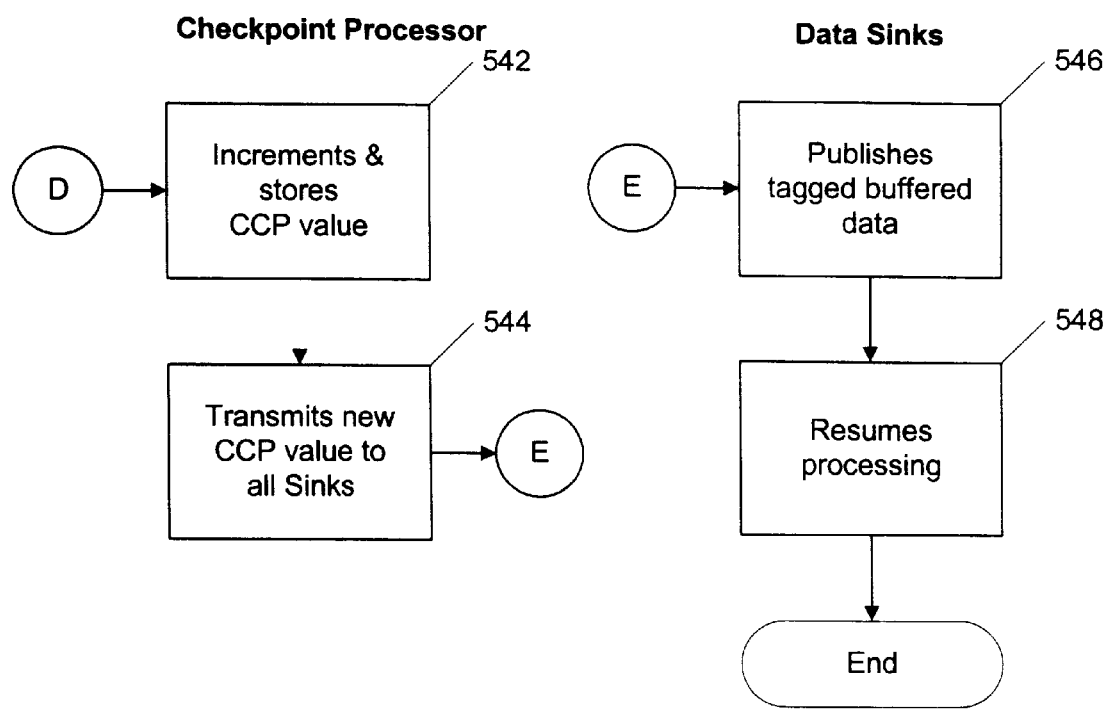

Under some circumstances, Sinks may publish data earlier than indicated in the procedure above. Early publication provides further improvements in end-to-end latency. For example, Sinks can publish data records early under the following conditions:

If pending unpublished record values are deterministic, then they may be published after Step 538 (FIG. 5C). "Deterministic" means that the same data records will be produced after a restart, although the order may differ. Whether this condition holds true is a property of each application, and is determined by a programmer. For a restart operation to recover from a failure, Sinks discard any recomputed data records that would overwrite data records that have been published early, so that duplicate records are not published.

If pending unpublished record values are deterministic AND ordered (i.e., they are monotonically increasing or decreasing), then they may be published at any time after receiving a checkpoint message. This shortens latency even more. Again, whether this condition holds true is a property of each application, and Sinks discard any recomputed data records computed during a restart that would overwrite data records that have been published early.

If republishing the same data records is acceptable, then they may be published at any time after receiving a checkpoint message. Such a situation may arise where timeliness is more important than exactness (e.g., real-time "hit" statistics).

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on one or more programmable computer systems each comprising at least one processor, at least one data storage system (including volatile and non-volatile memory and/or storage elements), at least one input device or port, and at least one output device or port. The program code is executed on the processors to perform the functions described herein.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer system, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the present invention have been described. Nevertheless, it will be understood that various modifications may be made without departing from the spirit and scope of the invention. For example, a number of the function steps described above may be performed in a different order without substantially affecting overall processing. Accordingly, other embodiments are within the scope of the following claims.

What is claimed is:

1. A method for continuous flow checkpointing in a data processing system having at least one process stage comprising a data flow and at least two processes linked by the data flow, the method including:

(a) propagating at least one command message through the process stage as part of the data flow;

(b) checkpointing each process within the process stage in response to receipt by each process of at least one command message.

2. The method of claim 1, further including:

(a) determining that the state of the data processing system needs to be restored;

(b) restoring each process to a corresponding saved state.

3. The method of claim 1, wherein at least one of such linked processes is a source or a sink.

4. The method of claim 1, wherein checkpointing includes suspending normal processing, saving a corresponding state, and returning to normal processing.

5. A method for continuous flow checkpointing in a data processing system having one or more sources for receiving and storing input data, one or more processes for receiving and processing data from one or more sources or prior processes, and one or more sinks for receiving processed data from one or more processes or sources and for publishing processed data, the method including:

(a) transmitting a checkpoint request message to every source;

(b) suspending normal data processing in each source in response to receipt of such checkpoint request message, saving a current checkpoint record sufficient to reconstruct the state of such source, propagating a checkpoint message from such source to any process that consumes data from such source, and resuming normal data processing in each source;

(c) suspending normal data processing in each process in response to receiving checkpoint messages from every source or prior process from which such process consumes data, saving a current checkpoint record sufficient to reconstruct the state of such process, propagating the checkpoint message from such process to any process or sink that consumes data from such process, and resuming normal data processing in such process;

(d) suspending normal data processing in each sink in response to receiving checkpoint messages from every process from which such sink consumes data, saving a current checkpoint record sufficient to reconstruct the state of such sink, saving any unpublished data, and resuming normal data processing in such sink.

6. The method of claim 5, further including completing any pending computations for each source, process, or sink before suspending normal data processing of such source, process, or sink.

7. The method of claim 5, further including deleting any old checkpoint record for each source, process, or sink before storing a current checkpoint record.

8. The method of claim 7, further including reclaiming storage space associated with any deleted old checkpoint record.

9. The method of claim 5, wherein each source includes a data queue, wherein saving a current checkpoint record includes saving a current data queue position, and further including reclaiming storage space associated with any data that occurs before the saved current data queue position.

10. The method of claim 5, wherein each sink includes a data queue, wherein saving a current checkpoint record includes saving a current data queue position, and further including reclaiming storage space associated with any data that occurs before the saved current data queue position.

11. The method of claim 5, further including:
(a) determining that the state of the data processing system needs to be restored;
(b) restoring the state of each source, process, and sink from a corresponding current checkpoint record.

12. The method of claim 5, further including generating the checkpoint request message in response to detecting a checkpoint trigger event.

13. The method of claim 12, wherein the checkpoint trigger event occurs periodically.

14. The method of claim 12, wherein the checkpoint trigger event is based on an external stimulus.

15. The method of claim 12, wherein the checkpoint trigger event is based on occurrence of selected data values within or derived from incoming data records being processed.

16. The method of claim 12, further including:
(a) scanning incoming data records within each source for a selected data value;
(b) upon detecting the selected data value within each source, transmitting a control message to any process that consumes data from such source, the control message indicating that an end of data has occurred, and requesting checkpointing;
(c) determining that a checkpoint trigger event has occurred once a control message is transmitted by every source.

17. The method of claim 12, further including:
(a) examining incoming data records within each source and determining a selected data value based on such examination;
(b) providing the selected data value to each source;
(c) scanning incoming data records within each source for the selected data value;
(d) upon detecting the selected data value within each source, transmitting a control message to any process that consumes data from such source, the control message indicating that an end of data has occurred, and requesting checkpointing;
(e) determining that a checkpoint trigger event has occurred once a control message is transmitted by every source.

18. The method of claim 5, further including coordinating checkpointing with periodic production of output from the sinks.

19. The method of claim 5, further including terminating data processing by:
(a) propagating an end of job indication through each source, process, and sink;
(b) exiting data processing in each source, process, and sink in response to the end of job indication instead of resuming normal data processing.

20. The method of claim 5, further including publishing such data values essentially immediately before resuming normal data processing.

21. The method of claim 5, further including determining that unpublished data values are deterministic, and publishing such data values essentially immediately after saving such unpublished data.

22. The method of claim 5, further including determining that unpublished data values are deterministic and ordered, and publishing such data values at any time after receiving checkpoint messages from every process from which such sink consumes data and before resuming normal data processing.

23. The method of claim 5, further including determining that republishing data values is acceptable, and publishing such data values at any time after receiving checkpoint messages from every process from which such sink consumes data and before resuming normal data processing.

24. A method for continuous flow checkpointing in a data processing system having one or more sources for receiving and storing input data, one or more processes for receiving and processing data from one or more sources or prior processes, and one or more sinks for receiving processed data from one or more processes or sources and for publishing processed data, the method including:
(a) transmitting a checkpoint request message to every source;
(b) suspending normal data processing in each source in response to receipt of such checkpoint request message, saving a current checkpoint record sufficient to reconstruct the state of such source, propagating a checkpoint message from such source to any process that consumes data from such source, and resuming normal data processing in each source;
(c) suspending normal data processing in each process in response to receiving checkpoint messages from every source or prior process from which such process consumes data, saving a current checkpoint record sufficient to reconstruct the state of such process, propagating the checkpoint message from such process to any process or sink that consumes data from such process, and resuming normal data processing in such process;
(d) suspending normal data processing in each sink in response to receiving checkpoint messages from every process from which such sink consumes data, saving a current checkpoint record sufficient to reconstruct the state of such sink, saving any unpublished data, and propagating the checkpoint message from each sink to a checkpoint processor;
(e) receiving the checkpoint messages from all sinks, and in response to such receipt, updating a stored value indicating completion of checkpointing in all sources, processes, and sinks, and transmitting the stored value to each sink; and
(f) receiving the stored value in each sink and, in response to such receipt, publishing any unpublished data associated with such sink and resuming normal data processing in such sink.

25. A computer program, stored on a computer-readable medium, for continuous flow checkpointing in a data processing system having at least one process stage comprising a data flow and at least two processes linked by the data flow, the computer program comprising instructions for causing a computer to:

(a) propagate at least one command message through the process stage as part of the data flow;

(b) checkpoint each process within the process stage in response to receipt by each process of at least one command message.

26. The computer program of claim 25, further including instructions for causing the computer to:

(a) determine that the state of the data processing system needs to be restored;

(b) restore each process to a corresponding saved state.

27. The computer program of claim 25, wherein at least one of such linked processes is a source or a sink.

28. The computer program of claim 25, wherein the instructions for causing the computer to checkpoint include instructions for causing the computer to suspend normal processing, save a corresponding state, and return to normal processing.

29. A computer program, stored on a computer-readable medium, for continuous flow checkpointing in a data processing system having one or more sources for receiving and storing input data, one or more processes for receiving and processing data from one or more sources or prior processes, and one or more sinks for receiving processed data from one or more processes or sources and for publishing processed data, the computer program comprising instructions for causing a computer to:

(a) transmit a checkpoint request message to every source;

(b) suspend normal data processing in each source in response to receipt of such checkpoint request message, save a current checkpoint record sufficient to reconstruct the state of such source, propagate a checkpoint message from such source to any process that consumes data from such source, and resume normal data processing in each source;

(c) suspend normal data processing in each process in response to receiving checkpoint messages from every source or prior process from which such process consumes data, save a current checkpoint record sufficient to reconstruct the state of such process, propagate the checkpoint message from such process to any process or sink that consumes data from such process, and resume normal data processing in such process;

(d) suspend normal data processing in each sink in response to receiving checkpoint messages from every process from which such sink consumes data, save a current checkpoint record sufficient to reconstruct the state of such sink, save any unpublished data, and resume normal data processing in such sink.

30. The computer program of claim 29, further including instructions for causing the computer to complete any pending computations for each source, process, or sink before suspending normal data processing of such source, process, or sink.

31. The computer program of claim 29, further including instructions for causing the computer to delete any old checkpoint record for each source, process, or sink before storing a current checkpoint record.

32. The computer program of claim 31, further including instructions for causing the computer to reclaim storage space associated with any deleted old checkpoint record.

33. The computer program of claim 29, wherein each source includes a data queue, wherein the instructions for causing the computer to save a current checkpoint record include instructions for causing the computer to save a current data queue position, and further including instructions for causing the computer to reclaim storage space associated with any data that occurs before the saved current data queue position.

34. The computer program of claim 29, wherein each sink includes a data queue, wherein the instructions for causing the computer to save a current checkpoint record include instructions for causing the computer to save a current data queue position, and further including instructions for causing the computer to reclaim storage space associated with any data that occurs before the saved current data queue position.

35. The computer program of claim 29, further including instructions for causing the computer to:

(a) determine that the state of the data processing system needs to be restored;

(b) restore the state of each source, process, and sink from a corresponding current checkpoint record.

36. The computer program of claim 29, further including instructions for causing the computer to generate the checkpoint request message in response to detecting a checkpoint trigger event.

37. The computer program of claim 36, wherein the checkpoint trigger event occurs periodically.

38. The computer program of claim 36, wherein the checkpoint trigger event is based on an external stimulus.

39. The computer program of claim 36, wherein the checkpoint trigger event is based on occurrence of selected data values within or derived from incoming data records being processed.

40. The computer program of claim 36, further including instructions for causing the computer to:

(a) scan incoming data records within each source for a selected data value;

(b) upon detecting the selected data value within each source, transmit a control message to any process that consumes data from such source, the control message indicating that an end of data has occurred, and requesting checkpointing;

(c) determine that a checkpoint trigger event has occurred once a control message is transmitted by every source.

41. The computer program of claim 36, further including instructions for causing the computer to:

(a) examine incoming data records within each source and determining a selected data value based on such examination;

(b) provide the selected data value to each source;

(c) scan incoming data records within each source for the selected data value;

(d) upon detecting the selected data value within each source, transmit a control message to any process that consumes data from such source, the control message indicating that an end of data has occurred, and requesting checkpointing;

(e) determine that a checkpoint trigger event has occurred once a control message is transmitted by every source.

42. The computer program of claim 29, further including instructions for causing the computer to coordinate checkpointing with periodic production of output from the sinks.

43. The computer program of claim 29, further including instructions for causing the computer to terminate data processing by:

(a) propagating an end of job indication through each source, process, and sink;

(b) exiting data processing in each source, process, and sink in response to the end of job indication instead of resuming normal data processing.

44. The computer program of claim 29, further including instructions for causing the computer to publish such data values essentially immediately before resuming normal data processing.

45. The computer program of claim 29, further including instructions for causing the computer to determine that unpublished data values are deterministic, and to publish such data values essentially immediately after saving such unpublished data.

46. The computer program of claim 29, further including instructions for causing the computer to determine that unpublished data values are deterministic and ordered, and to publish such data values at any time after receiving checkpoint messages from every process from which such sink consumes data and before resuming normal data processing.

47. The computer program of claim 29, further including instructions for causing the computer to determine that republishing data values is acceptable, and to publish such data values at any time after receiving checkpoint messages from every process from which such sink consumes data and before resuming normal data processing.

48. A computer program, stored on a computer-readable medium, for continuous flow checkpointing in a data processing system having one or more sources for receiving and storing input data, one or more processes for receiving and processing data from one or more sources or prior processes, and one or more sinks for receiving processed data from one or more processes or sources and for publishing processed data, the computer program comprising instructions for causing a computer to:

(a) transmit a checkpoint request message to every source;

(b) suspend normal data processing in each source in response to receipt of such checkpoint request message, save a current checkpoint record sufficient to reconstruct the state of such source, propagate a checkpoint message from such source to any process that consumes data from such source, and resume normal data processing in each source;

(c) suspend normal data processing in each process in response to receiving checkpoint messages from every source or prior process from which such process consumes data, save a current checkpoint record sufficient to reconstruct the state of such process, propagate the checkpoint message from such process to any process or sink that consumes data from such process, and resume normal data processing in such process;

(d) suspend normal data processing in each sink in response to receiving checkpoint messages from every process from which such sink consumes data, save a current checkpoint record sufficient to reconstruct the state of such sink, save any unpublished data, and propagate the checkpoint message from each sink to a checkpoint processor;

(e) receive the checkpoint messages from all sinks, and in response to such receipt, update a stored value indicating completion of checkpointing in all sources, processes, and sinks, and transmit the stored value to each sink; and (f) receive the stored value in each sink and, in response to such receipt, publish any unpublished data associated with such sink and resume normal data processing in such sink.

* * * * *